United States Patent [19]
Thompson et al.

[11] 3,798,349

[45]*Mar. 19, 1974

[54] MOLDED PLASTIC SPLICE CASING WITH COMBINATION CABLE ANCHORAGE AND CABLE SHIELDING GROUNDING FACILITY

[76] Inventors: John T. Thompson, 244 Loring Street, Los Angeles, Calif. 90024; George W. Gillemot, 2331 20th St., Santa Monica, Calif. 90405

[ * ] Notice: The portion of the term of this patent subsequent to Oct. 19, 1988, has been disclaimed.

[22] Filed: July 27, 1971

[21] Appl. No.: 166,386

Related U.S. Application Data

[63] Continuation-in-part of Ser. No. 12,819, Feb. 19, 1970, Pat. No. 3,614,298.

[52] U.S. Cl.................... 174/92, 174/78, 174/88 R
[51] Int. Cl............................................ H02g 15/08
[58] Field of Search.............. 174/92, 93, 138 F, 78, 174/88 R

[56] References Cited
UNITED STATES PATENTS

| | | | |
|---|---|---|---|
| 3,614,298 | 10/1971 | Thompson et al. | 174/92 |
| 3,636,240 | 1/1972 | Quante et al. | 174/92 |
| 3,636,241 | 1/1972 | Baumgartner et al. | 174/92 |

Primary Examiner—Darrell L. Clay
Attorney, Agent, or Firm—Sellers and Brace

[57] ABSTRACT

A cable splice casing cast in two mating halves from high strength plastic material and equipped with one or more conductive anchor assemblies for mechanically and electrically connecting the cable shield and sheath jackets to each end of the casing while the latter is open. The casing acts to interconnect the cable sheath across the splice area and to provide electrical continuity between the respective cable shield jackets. A heavy gauge conductor along the interior of the casing interconnects the cable anchor assemblies located at the opposite ends of the casing to carry heavier electrical charges whereas a conductive liner for the splice casing provides electrical shielding for the portion of the cabling exposed for making splice connections. The anchorages are spaced inwardly of a sealing gasket at each end of the casing and the latter can be opened for servicing and testing without disturbing the cable anchorage or the grounding connection between the cables and the casing.

2 Claims, 12 Drawing Figures

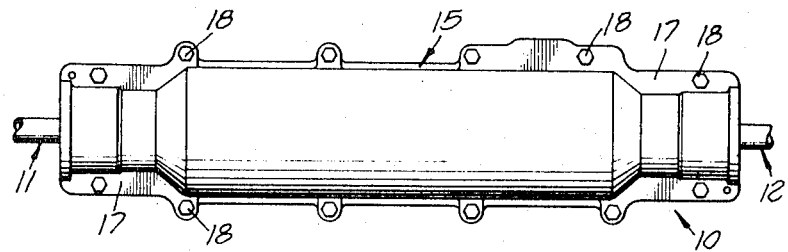
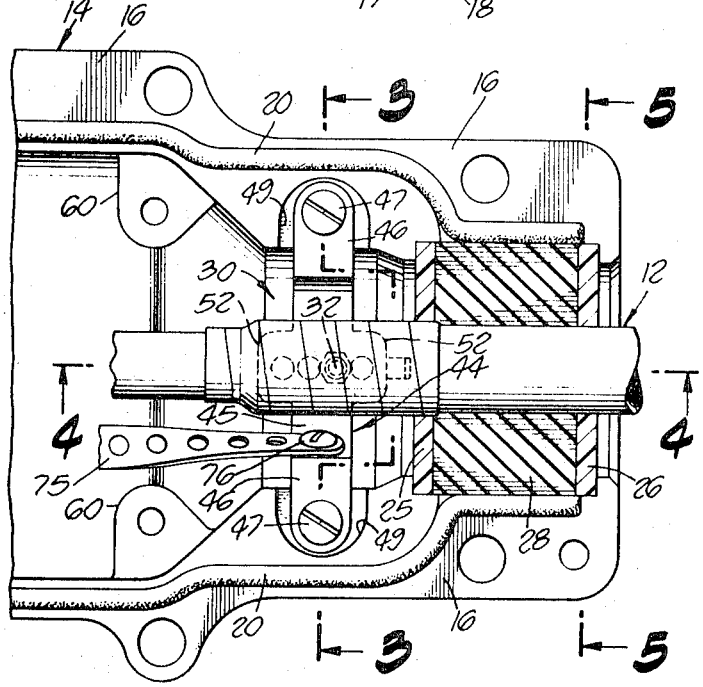
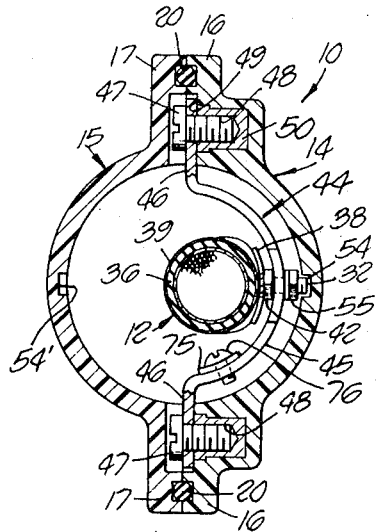
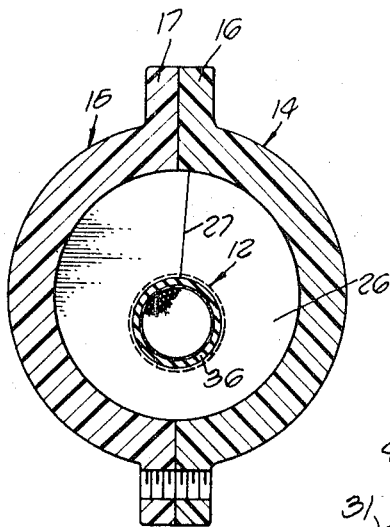
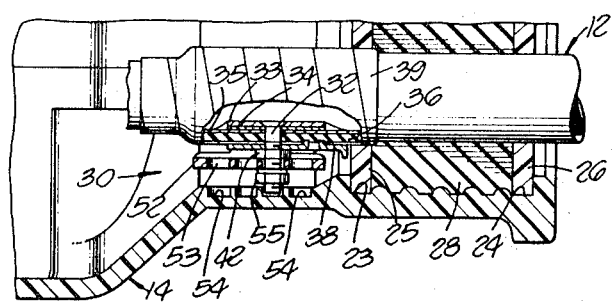
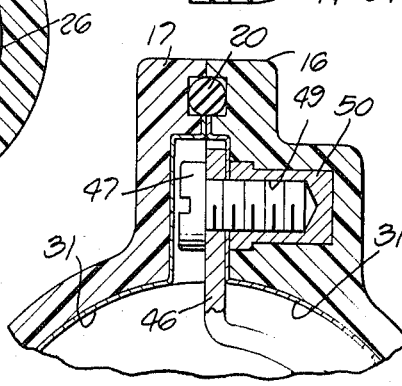

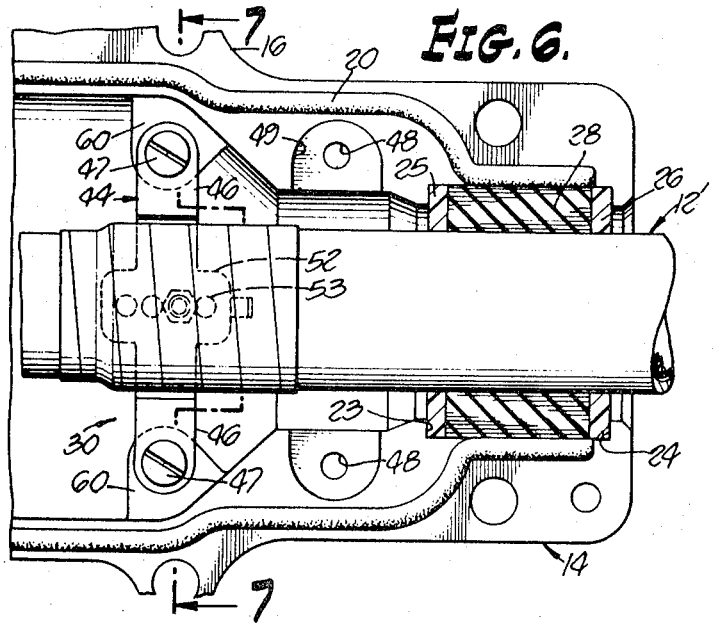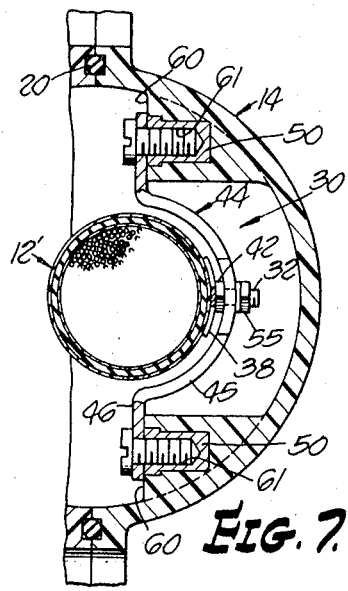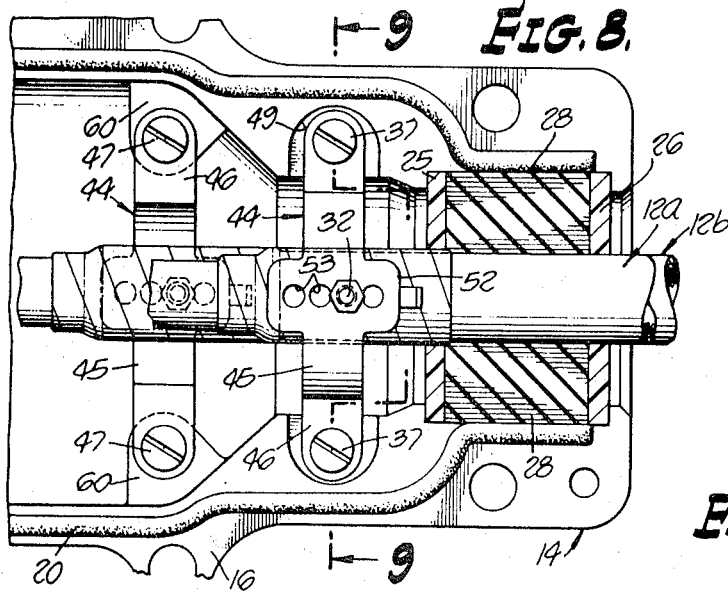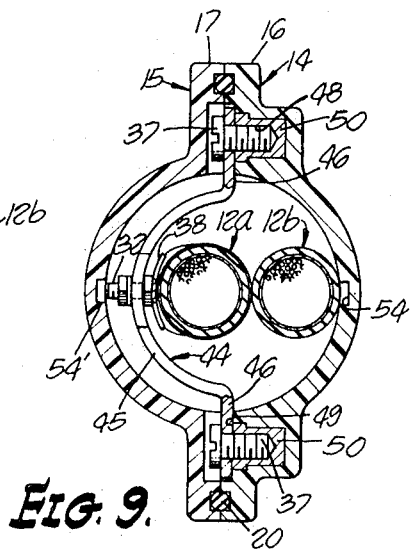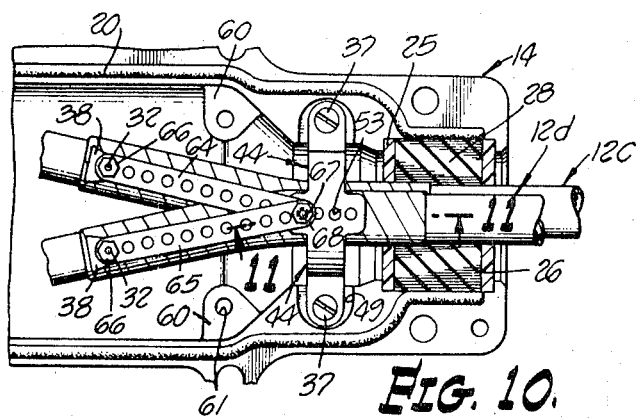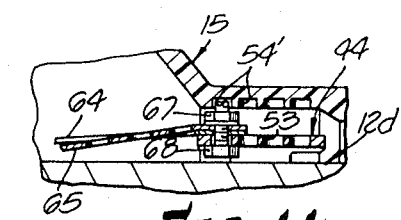

MOLDED PLASTIC SPLICE CASING WITH COMBINATION CABLE ANCHORAGE AND CABLE SHIELDING GROUNDING FACILITY

This application is a continuation-in-part of our co-pending application for U. S. Pat. Ser. No. 12,819 filed Feb. 19, 1970, now U.S. Pat. No. 3,614,298.

This invention relates to cable splice assemblies and more particularly to improved means for enclosing a splice zone with a protective non-metallic splice casing having means for completing a high strength mechanical and electrical connection between the cable sheath and shield jackets and readily accommodating one or two cables at either end of the casing.

Multiple conductor communication cables are used in countless numbers in communication networks and have need for frequent splice connections with one another and with branchout cable lines. The completion of such splice connections necessitates removal of a length of the protective sheath and of the underlying electrical shield jacket to expose the conductors. These conductors are not intended to carry any substantial portion of the cable load and this is especially true as respects spliced conductors which must be isolated from such tensile stresses. For this reason it is important to provide a suitable strong load-carrying connection to the cable sheath as well as a positive electrical connection between the shield jackets to either end of the splice zone.

It is becoming increasingly common to employ splice zones with a non-conductive protective casing cast or molded in two semi-cylindrical halves securable together along their mating edges. However, the designs heretofore proposed for this purpose are subject to numerous shortcomings and disadvantages sought to be avoided by the present invention. Thus such proposals have inadequate or no provision to anchor the cable to either end of the splice to the splice casing or to shield the spliced wires from ambient electrical fields.

Another serious problem attending the use of devices heretofore proposed to anchor and ground cable shielding jackets to one another between the opposite ends of the splice housing a problem which is accentuated when using splice housings formed of non-conductive material.

It is therefore a primary purpose of the present invention to provide a simple improved cable anchorage and grounding assembly for use in splice assemblies avoiding the foregoing and other shortcomings of prior designs. The invention anchorage utilizes a pair of metal shoes and a clamping screw insertable through an opening in the sidewall of the cable shield and sheath and effective to hold the latter rigidly clamped together. The threaded screw used for the clamping operation is then inserted through an anchorage strap straddling the cable in an area inside one end of the splice casing and having its ends rigidly securable to the splice casing to either side of the cable. This anchorage strap is formed of strong metal and is deeply arched so as to straddle cables of various diameters and is sufficiently strong to transmit substantially the full tensile strength of the cable sheath to the splice casing. Additionally this metal anchorage provides a positive highly-reliable electrical connection between the cable shield and a metallic lining or coating fixed to the interior surface of the molded plastic splice casing. This lining or coating provides a highly effective electrical shield for the spliced conductors. Desirably, each end of the splice casing is provided with pairs of longitudinally offset seating supports in electrical contact with the aforementioned metallic layer and selectively usable as the cable anchorages. At least one set of these seats is preferably offset inwardly from the open face of the casing thereby adding materially to the versatility of the splice casing and to accommodate cables of widely varying diameters or two or more cables of the same or different diameters. The cable anchor straps are also preferably provided with a plurality of openings in any one of which the threaded stud clamped to the cable sheath can be inserted thereby compensating for tolerance variations, contraction and shrinkage of the cable sheath and other variables. Additional current carrying capacity for the cable shield is provided by a heavy gauge bonding strap extending along the interior of the splice casing and having its ends detachably clamped to the arched anchorage strap for each cable.

As will be recognized from the foregoing, the invention anchorages are installed on the cable sheath and shielding jacket and then clamped to one of the casing halves while the other half is detached. After these parts have been installed the operator may thoroughly check the installation both mechanically and electrically before securing the cover half in place.

It is therefore a primary object of the present invention to provide a new and improved cable splice assembly featuring a molded plastic casing having provision for anchoring an electrical cable thereto.

Another object of the invention is the provision of a cable splice casing formed primarily of molded plastic composition and having an electrical shielding layer fixed thereto with provision for connecting the same in circuit with the shield jacket of each cable served by the splice casing.

Another object of the invention is the provision of a plastic splice casing with a built-in electrical shield for the spliced conductors and heavy duty means interconnecting the shield jackets of cables entering the splice casing.

Another object of the invention is the provision of an improved lightweight non-metallic cable splice casing with a built-in electrical shield extending substantially from end to end thereof.

Another object of the invention is the provision of an improved non-metallic cable splice casing formed in separable halves having simple, highly effective mechanical and electrical anchorage means readily connectable to either a cable sheath or shield jacket or to both without placing the conductors themselves under stress or strain.

These and other more specific objects will appear upon reading the following specification and claims and upon considering in connection therewith the attached drawings to which they relate.

Referring now to the drawing in which a preferred embodiment of the invention is illustrated:

FIG. 1 is a side view of a typical embodiment of the invention splice assembly installed about a cable splice;

FIG. 2 is a longitudinal elevational view on an enlarged scale through one end of the assembly shown in FIG. 1 and showing the front half of the splice casing detached;

FIG. 3 is a cross sectional view along the broken line indicated at 3—3 on FIG. 2 but showing the forward casing half in assembled position;

FIG. 4 is a cross sectional view taken generally along line 4—4 on FIG. 2 and showing parts of the anchor assembly broken away;

FIG. 5 is a cross sectional view taken along line 5—5 on FIG. 2;

FIG. 6 is a view similar to FIG. 2 but showing the cable anchor means installed in an alternate position;

FIG. 7 is a cross sectional view taken along line 7—7 on FIG. 6;

FIG. 8 is a view similar to FIG. 6 but showing two small cables installed in the casing with each anchored to a different portion of the splice casing;

FIG. 9 is a cross sectional view taken along the broken line 9—9 on FIG. 8;

FIG. 10 is a view similar to FIG. 8 but showing a different mode of anchoring a pair of cables to the splice casing;

FIG. 11 is a fragmentary cross sectional view on an enlarged scale taken along line 11—11 on FIG. 10; and FIG. 12 is a fragmentary cross sectional view on an enlarged scale of the upper end portion of FIG. 3 and showing more clearly details of the conductive liner or coating for the interior surfaces of the splice casing shown in FIGS. 1 to 11.

Referring initially and more particularly to FIGS. 1 to 5, there is shown a typical embodiment of the invention splice case assembly designated generally 10, installed over a splice between two aligned cables 11,12 entering its opposite ends. The splice case comprises a pair of cast or molded semicylindrical halves 14,15 having radial flanges 16,17 projecting from their opposite sides and releasably clamped together by cap screws 18. Each of the casings 14,15 is formed of high strength non-conductive plastic material of which there are numerous suitable compositions well known to those skilled in the plastics art. The juxtaposed surfaces of flanges 16 and 17 are provided with mating channels seating a sealing gasket 20 in accordance with customary practice.

Additional sealing means for forming a hermetic seal between the casing halves and cabling entering their opposite ends is best shown in FIG. 4. Thus, the reduced diameter inlet collar at either end of the casing is formed with a pair of inwardly directed annular recesses 23,24 seating gasket rings or washers 25,26 flanked from suitable flexible insulating material, such as sheet plastic. These gasket rings are formed with openings sized to fit snugly about the particular cabling entering the splice casing and include a radial slit 27 running from the opening through one edge of the gasket, and facilitating the assembly of the gasket ring to the cable. The space between rings 25,26 is filled with suitable sealing material such as a plastic buna tape or cording which is sufficiently plastic as to be readily distributed to fill the cavity between rings 25,26 despite the fact the cable is offset very substantially to one side of the center of these rings.

The combination electrical and mechanical anchorage interconnecting the cable sheath and the splice casing, designated generally 30, comprises two principal sub-assemblies, the first including the components attached firmly to the cable shield and electrical shield, and the second including means interconnecting this first sub-assembly to the splice casing and to the conductive shielding layer or coating 31 (FIG. 12) suitably bonded to the interior surfaces of casing halves 14,15 substantially fron end to end thereof. Thin metal foil or a conductive coating is applied to all interior surfaces to provide a complete shielding jacket having its opposite ends overlapping the cable shield jackets 35. In consequence there is no gap in the shielding for the conductors even though it is necessary to break into the cable shield jacket in order to splice the conductors together. FIG. 12 also makes clear that conductive layer 31 extends between the mating flanges 16,17.

The above mentioned first sub-assembly includes a threaded shank 32 having its inner end fixed to an arcuate metallic shoe 33. Preferably a resilient metallic shim 34, supported by shoe 33, is formed with sharp tangs which penetrate any insulative film which may be present on the cable shielding jacket 35. It will be understood that this electrical shielding jacket is of the customary type surrounding the cable conductors and underlying the thick insulative sheath 36 of the cable. The threaded shank 32 extends through aligned openings formed in shield 35 and sheath 36 and then through an opening centrally of a metal clamping shoe 38 conforming to the external contour of the cable. The assembly of shank 32 from the inner ends of these aligned mounting openings is preferably performed in the manner disclosed in detail in our copending application for U. S. Pat., Ser. No. 12,820, filed Feb. 19, 1970. The portion of the cable to either side of shank 32 is then served with snug convolutions of strong pressure sensitive tape 39 prior to the assembly of the outer clamping shoe 38. Thereafter, the clamping shoe is inserted over shank 32 and securely clamped in place by clamping nut 42.

From the foregoing it will be recognized that tightening of the clamping nut 42 serves to compress inner shoe 34 and outer shoe 38 against the intervening electrical shield jacket 35 and cable sheath 36 thereby providing an extremely high strength mechanical connection to these two layers as well as an electrical connection between shoe 33, shield jacket 35 and shank 32.

The second anchorage or companion sub-assembly comprises a heavy gauge metal strap 44 having an arched portion 45 interposed between oppositely directed ends 46 formed wih openings for clamping screws 47,47. Screws 47 seat in threaded bores 48 (FIG. 3) formed in flanges 16,16 of casing half 14 and opening into shallow recesses 49. The threaded bores are formed in metal inserts 50 molded into the casing halves. Anchor strap 44 is preferably provided with aligned projections 52 projecting from its opposite lateral sides and formed with a series of holes 53 any one of which may be assembled about threaded shank 32 of the first described anchor sub-assembly and clamped tightly in place by a nut 55 (FIGS. 3, 4). As is best shown in FIG. 4, the splice casing is formed with shallow wells or detent means 54 aligned with openings 53 and adapted to loosely receive the outer end of shank 32. It will therefore be evident that irrespective of which of openings 53 is used to accommodate shank 32 the outer end of the shank will extend into one of the wells 54. It will be understood that these wells or detents cooperate with the shank in strengthening and stabilizing the anchor assembly in response to tension forces commonly acting along the cables entering the ends of the splice casing.

Referring now to FIGS. 6 and 7, the described anchorage assembly 30 is shown installed in the same splice casing to provide an electrical and mechanical anchorage between a much larger cable and casing half 14. In this particular installation however, the ends 46 of the cable anchorage strap 44 are supported on a pair of bosses 60 formed integral with casing half 14 in an area spaced axially inwardly of mounting recesses 49 on which the strap is shown supported in FIGS. 1-4. Each of these bosses is formed with a threaded well 61 in a metal insert similar to insert 50 described above. It will be noted from FIG. 7 that the upper ends of bosses 60 are coplanar with one another and located in a plane spaced substantially below the level of the mounting surfaces 49. This arrangement not only facilitates the accommodation of a considerably larger cable but also permits a small diameter cable to enter the same end of the splice housing as will be described presently in connection with FIGS. 8 and 9. it will be understood that the cable shield and sheath are anchored to strap 44 by a clamping sub-assembly of the same construction described above in connection with FIGS. 1-5 and that a portion of the conductive layer 31 (FIG. 12) is clamped between insert 50 and the end of strap 44.

Referring now to FIGS. 8 and 9, the splice casing and anchorage is shown in use with two cables 12a,12b of relatively small diameter entering the same end of the splice casing in closely spaced side by side relation. Separate identical anchorage assemblies to those described above are employed for the respective cables. As shown, the anchorages are installed on the remote sides of the two cables 12a,12b with the arched portion of the two straps facing toward one another and positioned for the securement of their ends to a respective set of the threaded wells 48,48 and 61,61. Thus, the arched portion of the anchorage for cable 12a faces upwardly or to the left as viewed in FIG. 9, whereas the corresponding anchorage strap 44 for cable 12b underlies this cable as shown in FIG. 8 with its outer ends secured to bosses 60 by anchor screws 47.

The cables enter the splice casing through appropriately contoured gaskets 25,26 and the plastic packing material 28 is distributed therebetween in a manner completely filling the space between the cable, gaskets 25,26 and the interior side walls of the end portions of the splice casing to provide a hermetic seal.

Referring now to FIGS. 10 and 11, there is shown one manner in which a single anchor strap 44 can be employed to anchor a pair of smaller diameter cables 12c,12d to splice casing half 14. In this case the anchor subassemblies providing an anchorage connection to each of the cable shields and sheaths are installed on a portion of each of the cable sheaths located substantially inwardly of the inlet ends of the casing halves 14, 15 as for example forwardly of anchor bosses 60,60. As shown, anchor strap 44 is secured in place in clamping recesses 49 following which its midportion is rigidly connected to the threaded shanks 32,32 by metal straps 64,65 each provided with closely spaced holes. A hole at the inner ends of each strap is secured to a respective threaded shank, as by clamping nuts 66, and the other ends are secured by a common nut and bolt assembly 67,68 to one of the holes 53 in anchor strap 44. Desirably the outer ends of bolts 68 project into one of the shallow wells 54' in cover half 15 and serve to strengthen and stabilize the adjacent portions of the anchorage assembly.

Another feature of importance preferably provided in each of the above described constructions is a supplemental heavy duty bonding strap 75 best shown in FIGS. 2 and 3. This strap is similar to conductive straps 64,65 just described in connection with FIGS. 10 and 11 but is employed to provide a heavy duty conductive path between the anchor straps 44 which have such an excellent electrical connection to each cable shield jacket. To this end bonding straps 75 are tightly but separably anchored to straps 44 by cap screws 76 mating with threaded bores in straps 44. It will be understood that straps 75 are formed of ductile conductive material and are readily shaped by finger pressure to lie closely against the interior surface of the conductive layer 31. Although not illustrated in all views, it will be understood that the heavy capacity bonding straps 75 are preferably present in all variants of the present invention and are so located as not to interfere with the splice connections or the opening and closing of the splice casing halves.

While the particular molded plastic splice casing with combination cable anchorage and cable shield grounding facility herein shown and disclosed in detail is fully capable of attaining the objects and providing the advantages hereibefore stated, it is to be understood that it is merely illustrative of the presently preferred embodiment of the invention, and that no limitations are intended to the details of construction or design herein shown other than as defined in the appended claims.

We claim:

1. A cable splice casing formed in two mating halves from tough high strength plastic material and including means holding said halves secured together in a fluid-tight manner, said casing having cable inlet openings at its opposite ends, means for sealing said casing halves closed about cabling insertable through said cable inlet openings, each of said casing halves including a layer of conductive material extending substantially the length of said casing and adapted to overlap the shield jacket of shielded cables adjacent the interior ends of said cable inlet openings, threaded wells opening into the interior of said casing inwardly of either end thereof and located along the opposite sides of said cable inlet openings, an arched conductive anchor strap extending crosswise of the interior of said casing at each end thereof and including threaded clamping screw means anchoring the opposite ends thereof to a respective one of said wells and in conductive relation to the conductive layer of said casing half, and metallic cable clamping means securable to an opening through a respective cable shield jacket and the overlying portion of a cable sheath and including means anchoring the same to the adjacent one of said anchor straps.

2. A cable splice casing as defined in claim 1 characterized in the provision of a heavy gauge conductor extending lengthwise of the interior of said splice casing and having its ends connected to a respective one of said cable anchor straps and providing high-strength high-capacity bonding connections electrically interconnecting said cable anchor straps.

* * * * *